United States Patent
Shah (10) Patent No.: US 8,630,788 B2
(45) Date of Patent: Jan. 14, 2014

(54) METHOD AND SYSTEM FOR NOTIFYING A USER OF A PREDETERMINED TRAFFIC CONDITION

(76) Inventor: Varun A Shah, San Jose, CA (US)

( * ) Notice: Subject to any disclaimer, the term of this patent is extended or adjusted under 35 U.S.C. 154(b) by 1313 days.

(21) Appl. No.: 11/766,278

(22) Filed: Jun. 21, 2007

(65) Prior Publication Data

US 2008/0319643 A1    Dec. 25, 2008

(51) Int. Cl.
*G01C 21/00* (2006.01)
(52) U.S. Cl.
USPC .......................................... 701/117; 348/148
(58) Field of Classification Search
USPC ............ 701/200–202, 23–25, 117–119, 204, 701/400, 408–410, 426; 340/988, 994, 340/995.13; 348/148, 149
See application file for complete search history.

(56) References Cited

U.S. PATENT DOCUMENTS

| | | | | |
|---|---|---|---|---|
| 5,337,082 A | * | 8/1994 | Fredericks | 342/69 |
| 7,155,335 B2 | * | 12/2006 | Rennels | 701/117 |
| 7,693,652 B2 | * | 4/2010 | Cheung | 701/467 |
| 2008/0021632 A1 | * | 1/2008 | Amano | 701/117 |

* cited by examiner

*Primary Examiner* — Dalena Tran
(74) *Attorney, Agent, or Firm* — Varun A. Shah (57) ABSTRACT

A method for notifying a user, including obtaining a route and a predetermined traffic condition associated with the route; identifying an occurrence of the predetermined traffic condition associated with the route; and notifying the user of the occurrence of the predetermined traffic condition associated with the route.

14 Claims, 8 Drawing Sheets

METHOD AND SYSTEM FOR NOTIFYING A USER OF A PREDETERMINED TRAFFIC CONDITION

BACKGROUND

People generally have to travel on roads with varying patterns of traffic at various times of the day. Traveling when traffic is heavy leads to an undesirable increased amount of travel time between two locations, waste of fuel, waste of energy, frustration and countless other negative effects.

In order to avoid traffic, people often change routes dynamically while traveling in order to find routes with a lower amount of traffic. Another solution to avoid traffic is to check the traffic on the radio or television before traveling. Alternatively, a person may access a web based application and submit a request for a traffic report for a particular region. In response the web based application may display a map of roads with current traffic conditions.

SUMMARY OF INVENTION

In general, in one aspect, the invention relates to a method for notifying a user. The method comprises obtaining a route and a predetermined traffic condition associated with the route, identifying an occurrence of the predetermined traffic condition associated with the route, and notifying the user of the occurrence of the predetermined traffic condition associated with the route.

In general, in one aspect, the invention relates to a method for receiving a notification. The method comprises providing one from a group consisting of a route, and two locations used to determine a route, where an occurrence of the predetermined traffic condition associated with the route is identified; and receiving a notification of the occurrence of the predetermined traffic condition associated with the route.

In general, in one aspect, the invention relates to a system for notifying a user. The system comprising: a data repository comprising a predetermined traffic condition; a management engine, comprising functionality to: identify the occurrence of the predetermined traffic condition associated with a route; and a user interface comprising functionality to: notify the user of the occurrence of the predetermined traffic condition associated with the route.

In general, in one aspect, the invention relates to a computer readable medium comprising instructions for notifying a user. The instructions comprising functionality for: obtaining a route and a predetermined traffic condition associated with the route; identifying an occurrence of the predetermined traffic condition associated with the route; and notifying the user of the occurrence of the predetermined traffic condition associated with the route.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for notifying a user. Specifically, embodiments of the invention allow for notifying a user of the occurrence of a predetermined traffic condition.

Figure 1:
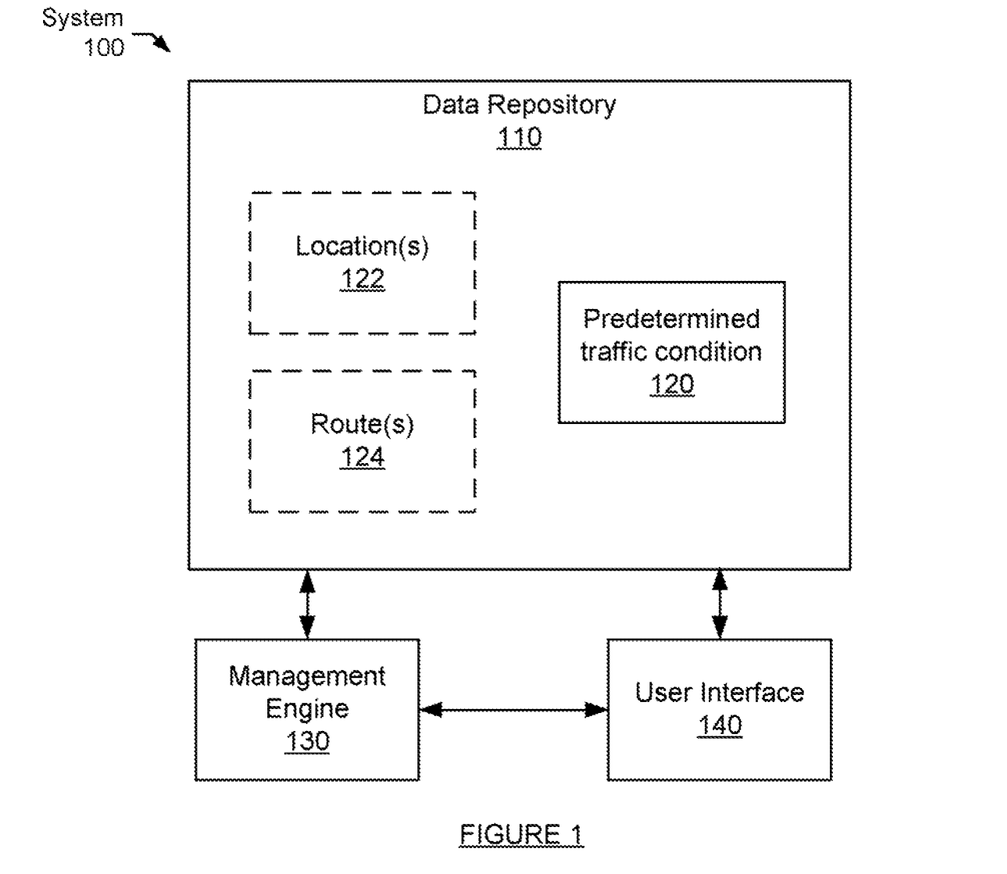
FIG. 1 shows a diagram of a system for notifying a user in accordance with one or more embodiments of the invention.

FIG. 1 shows a system (100) in accordance with one or more embodiments of the invention. As shown in FIG. 1, the system (100) includes a data repository (110), a management engine (130), and a interface (140). Each of these components is described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments.

In one or more embodiments of the invention, the system (100) is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces (e.g. interface (140), web portals, or any other tool to access the system). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the data repository (110) includes functionality to store a predetermined traffic condition(s) (120), location(s) (122) and route(s) (124). In one or more embodiments of the invention, access to the data repository (110) is restricted and/or secured. As such, access to the data repository (110) may require authentication using passwords, secret questions, personal identification numbers (PINs), biometrics, and/or any other suitable authentication mechanism. Those skilled in the art will appreciate that elements or various portions of data stored in the data repository (110) may be distributed and stored in multiple data repositories. In one or more embodiments of the invention, the data repository (110) is flat hierarchical, network based, relational, dimensional, object modeled, or structured otherwise. For example, data repository (110) may be maintained as a table of a SQL database. In addition, data in the data repository (110) may be verified against data stored in other repositories.

Continuing with FIG. 1, in one or more embodiments of the invention, the location(s) (122) shown as stored in the data repository (110) corresponds to any physical address.

Examples of physical addresses include (but are not limited to) full addresses, partial addresses, an airport, a town, a city, a state and/or any other reference to a physical space. The location(s) (122) may also be defined by coordinates such as a latitude and/or longitude. The locations (122) may be received from an interface (e.g., user interface (140)), software application, or any other suitable source. The location(s) (122) may be used to determine one or more routes (124) between the location(s) (122).

In accordance with one or more embodiments of the invention, the routes (124) correspond to a path between at least two locations (122). The route (124) may begin at one location and end at a second location or alternatively, the route (124) may begin and end at the same location (e.g., a delivery route). The route may be created by any software application, system, or user. Multiple routes (124) may be created for the same set of locations (122). For example, the first route between two locations may include freeways, whereas a second route may include only local roads. Alternatively, multiple routes (124) between different locations may correspond to routes using different highways, freeways, roads, intersections. Different routes may or may not include overlapping portions.

Continuing with FIG. 1, in one or more embodiments of the invention, the predetermined traffic condition (120) shown as stored in the data repository (110) corresponds to any condition associated with vehicular traffic associated with a route (124). A predetermined traffic condition (120) may correspond to (but is not limited to) an estimated travel time, a level of traffic (e.g., high, medium, low, moving, backed up, blocked), and/or an accident. The traffic condition may be defined by a user using an interface (e.g., user interface (140)), by an application, by a system or by any other suitable source. In one or more embodiments of the invention, multiple traffic conditions (120) for the same route(s) may be defined. For example, the traffic conditions: medium traffic and low traffic may be both be defined and used for consecutive alerts associated with the route (124). In one or more embodiments of the invention, the predetermined traffic condition (120) may include a date and/or a time. For example, the predetermined traffic condition may be a "low traffic level after 8 am on weekdays." Another example of a predetermined traffic condition may be the next occurrence of an accident free roadway or the first occurrence in the weekend of a low traffic level between a specified suburb and a city. In another example, the predetermined traffic condition may include "any change in traffic level between 4 pm and 6 pm." In this example, the predetermined condition may occur each time a traffic level category changes between 4 pm and 6 pm (e.g., change to medium traffic level, to high traffic level, to low traffic level, or any other suitable categorization).

While shown in FIG. 1 as stored in a single repository, one skilled in the art will appreciate that each portion of the data may be located in one or more data repositories (e.g., data repository (110)). For example, the locations (122) and/or routes (124) may be distributed across multiple servers. Alternatively, the locations (122) and/or routes (124) may not be stored in a data repository and used immediately upon receipt from a user or a software application.

Continuing with FIG. 1, in one or more embodiments of the invention, the management engine (130) corresponds to a process, software application, and/or computer system that may include functionality to generate one or more routes (124) using at least two locations (122), and identify the occurrence of the predetermined traffic condition (120) for at least one route (124) between two locations (122). The management engine (130) may generate routes between two locations based on any factor such as (but not limited to) the use of freeways, the use of local roads, businesses on a route, a scenic view, a prior traffic condition associated with the route, a construction status of the route, an accident reported on the route, a time of the day, the driver, or any other relevant factor. Alternatively, the management engine (130) may directly obtain the route (i.e., not generate the route) from any source (e.g., a software application, a user, a system or any other source). Once the route(s) (124) is obtained, the management engine (130) identifies the occurrence of the predetermined traffic condition (120) for at least one route (124). In a simple embodiment of the invention, the management engine (130) identifies the occurrence of a predetermined traffic condition (120) for a single route (124). In another embodiment of the invention, the occurrence of the predetermined traffic condition (120) may be identified in any route (124) between two locations. For example, consider the scenario where a user provides two locations and defines the predetermined traffic condition as a maximum estimated travel, time of thirty minutes. In this scenario, the management engine may determine three different routes between the two locations provided by the user and may further identify at least one route of the three routes when the predetermined traffic condition occurs for that route. Furthermore, in one or more embodiments of the invention, the management engine (130) may include functionality to determine the occurrence of the predetermined traffic conditions (120) for routes (124) including more than two locations (122). For example, consider a delivery driver that must travel to five different locations under a maximum of three hours (i.e., the predetermined traffic condition). In this case, the management engine may determine multiple routes that cover all five locations, monitor each of the routes and identify a route of the multiple routes that covers the five locations as soon as the estimated travel time for the identified route is three hours or less.

Still continuing with the management engine (130) of FIG. 1, the management engine (130) may include functionality to evaluate multiple predetermined traffic conditions (120) for the same route (124). For example, the management engine may identify the occurrence of a medium traffic level for a route and thereafter (i.e., when the traffic subsides), identify the occurrence of a low traffic level for the same route. Another example may involve an estimated time for travel. Consider the scenario where the management engine identifies the occurrence of an estimated travel time of fifty minutes, and thereafter identifies an estimated travel time of thirty minutes when the traffic subsides and even further identifies an estimated travel time of twenty minutes when the traffic yet further subsides. The predetermined traffic conditions (120) may also be setup in increasing increments. For example, the predetermined traffic conditions (120) may be a high traffic level and the management engine identify the occurrence of the high traffic level which may be used to warn a user not to travel.

Continuing with FIG. 1, the user interface (140) corresponds to any sort of interface adapted for use to access the system (100) and any services provided by the system (100) in accordance with one or more embodiments of the invention. The user interface (140) may be a web interface, graphical user interface (GUI), command line interface, an application interface or other suitable interface. The user interface (140) may include one or more web pages that can be accessed from a computer with a web browser and/or internet connection. Alternatively, the user interface (140) may be an application that resides on a computing system, such as personal computers (PCs), mobile devices (e.g., cell phones, pagers, mp3 players, mobile media centers), personal digital assistants (PDAs), and/or other digital computing devices of the users, and that communicate with the system (100) via one or more network connections and protocols. Regardless of the architecture of the system, communications between the system (100) and the user interface (140) may be secure, as described above. Functionalities and components of the user interface (140) are further described below in the description of FIG. 2.

Figure 2:
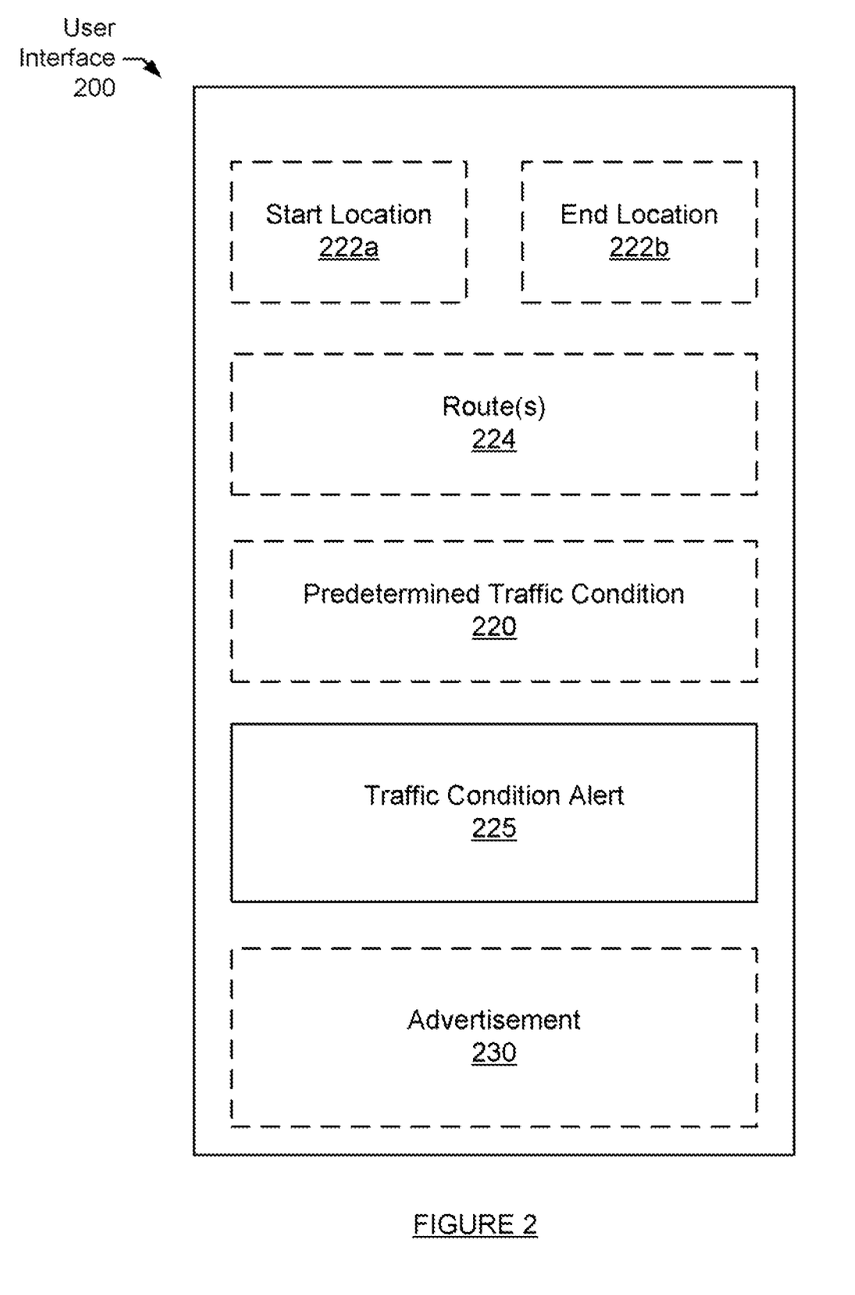
FIG. 2 shows an interface for notifying a user in accordance with one or more embodiments of the invention.

FIG. 2 shows a user interface (200) for notifying a user in accordance with one or more embodiments of the invention. As shown in FIG. 2, the user interface (200) may include a start location (222*a*), an end location (222*b*), a route (224), a predetermined traffic condition (220), a traffic condition alert (225), and an advertisement (230). Although, shown in user interface (200), the start location (222*a*), end location (222*b*), route (224) and advertisement (230) may not be shown in one or more embodiments of the invention. Furthermore, different components shown in user interface (200) may be implemented on multiple interfaces. For example, a computer monitor may be used to enter the start location (222*a*), end location (222*b*), and/or route (224) and a mobile device may be used to receive the traffic condition alert (220). Alternatively, all components may be present on a single interface (e.g., user interface (200).

In one or more embodiments of the invention, the start location (222*a*) and the end location (222*b*) are essentially the same as location (122) shown in FIG. 1. The start location (222*a*) corresponds to the start of the route (224) and the end location (222*b*) corresponds to the end of the route (224). In one or more embodiments of the invention, any number of locations may be entered and used to determine the route (224). The start location (222*a*) and/or the end location (222*b*) may be submitted by a user, a software application or any other suitable source.

In one or more embodiments of the invention, the route(s) (224) is essentially the same as route (124) shown in FIG. 1. The route(s) corresponds to one or more paths from start location (222*a*) to end location (222*b*) (may also include intermediate locations). The route (224) may be determined using the start location (222*a*) and/or the end location (222*b*). Alternatively the route (224) may be submitted by a user, a software application or any other suitable source.

Continuing with FIG. 2, in one or more embodiments of the invention, the predetermined traffic (220) is essentially the same as the predetermined traffic condition (120) shown in FIG. 1. The predetermined traffic condition (220) may or may not be shown in user interface (200). In one or more embodiments of the invention, the predetermined traffic condition (220) is submitted by a user using an interface (e.g., user interface (200)).

In one or more embodiments of the invention, the traffic condition alert (225) corresponds to a notification of an occurrence of the predetermined traffic condition (220). The traffic condition alert (225) may be a message (e.g., an electronic message, a text message, a page or any other suitable method of alerting a user), a sound (e.g., a beep, an alarm, an audio notification or any other suitable audio notification of the occurrence of the predetermined traffic condition (220)) a vibration (e.g., a cell phone vibration) or any other suitable form of notification that can be used to alert a user of the occurrence of a predetermined traffic condition (220).

In one or more embodiments of the invention, the advertisement (230) corresponds to any announcement or notice. In one or more embodiments of the invention, the advertisement (230) is displayed at the same time as the traffic condition alert (225). In one or more embodiments of the invention, the advertisement may be selected based on a route displayed or identified to a user. For example, the advertisement may correspond to a business that is located along the route identified to have the predetermined traffic condition. Consider the scenario where a user wishes to be alerted of the first occurrence of the predetermined traffic condition (e.g., a maximum estimated time required for travel) along any route from work to home. Once the predetermined traffic condition is met for a particular route, an alert sent to the user may include a happy hour special of a bar along the route with the occurrence of the predetermined traffic condition. Accordingly, embodiments of the invention, allow for targeted advertising that show advertisements (230) based on the route the user may take. Furthermore, the advertisements (230) may also be based on a time. For example, advertisements corresponding to breakfast restaurants may be shown in the morning and dinner restaurants may be shown during the evening. Alternatively, in an embodiment of the invention, the advertisement (230) may not exist (i.e. may not be displayed at all).

Figure 3:
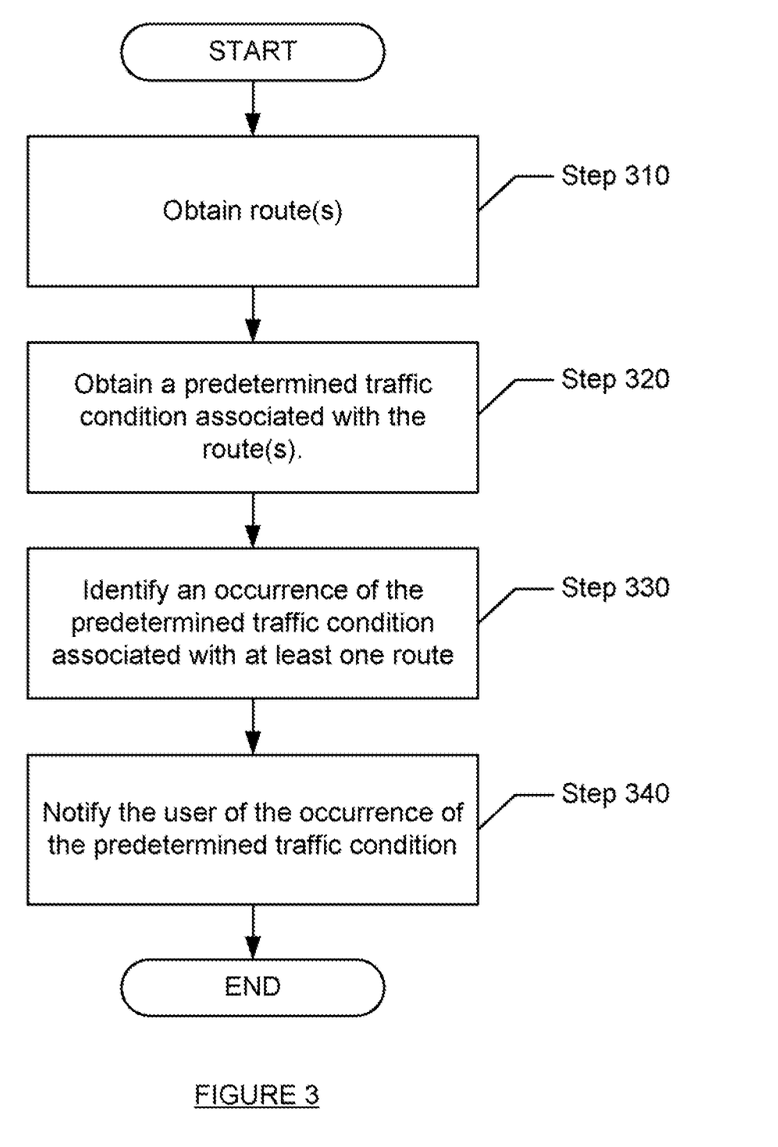
FIG. 3 shows a flow chart for notifying a user in accordance with one or more embodiments of the invention.

FIG. 3 shows a flow chart for notifying a user in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a route is obtained (Step 310). In one or more embodiments of the invention, one or more routes may be obtained from a user, a software application, a system or from any other suitable source. In another embodiment of the invention, two or more locations may be used to determine and obtain the route. For example, an algorithm may be used to determine all pathways between two points on known roads and thereafter a route may be selected based on shortest distance. The route may be also be selected based on speed, estimated travel time, road type (e.g., freeway, local roads, etc.), known/traveled roads or any other suitable criteria. In one or more embodiments of the invention, multiple routes may be obtained based on two or more locations. In another embodiment of the invention, multiple routes may be presented to a user and a user selection may be used to obtain a specific route.

Next a predetermined traffic condition is obtained (Step 320). The predetermined traffic condition may be obtained from a user, a software application, a system, a database or from any other suitable source. In one or more embodiments of the invention, the predetermined traffic condition may be input by a user on a daily basis. In another embodiment of the invention, a schedule may be setup for a predetermined traffic condition. For example, a predetermined traffic condition may be received from a user for the occurrence of a "low traffic" level for a specific route for all weekdays. Another example, may include receiving the predetermined traffic condition from a mobile device requesting notification of the next occurrence of a thirty minute estimated travel time for a route between two specified locations. In another embodiment of the invention, the predetermined traffic conditions may be obtained based on analysis of the driving patterns of a user. For example, a sensor in a user's vehicle may collect information about the speed the user travels at. The average speed of the user may then be used to calculate an estimated time for the predetermined traffic condition. For instance if the user generally travels at 55 mph, a flow of traffic averaging 55 mph may be determined to be the predetermined traffic condition.

Once the predetermined traffic condition has been obtained (or determined), an occurrence of the predetermined traffic condition is identified (Step 330). The occurrence of the predetermined traffic condition may be identified based on analysis of one or more routes. In a simple embodiment of the invention, a specific route is obtained and monitored for the occurrence of the predetermined traffic condition. For example, an obtained route may be monitored for the occurrence of a low traffic level or a particular estimated travel time from a start point to an end point. Another example, may involve a first occurrence of an average speed of 30 or higher on Interstate 101 after 5 pm. If at 5 pm, the average speed is 30 mph or higher, the occurrence of the predetermined traffic condition is immediately identified. However, if the average speed is below 30 mph, Interstate 101 may be monitored until the average speed reaches 30 mph or higher. Once the desired speed is reached, the occurrence of the predetermined traffic condition is identified.

In an embodiment of the invention, a route may be segmented into multiple portions. Thereafter each portion of the route may be examined for the predetermined traffic condition (e.g. a low traffic level). If each portion of the route meets the predetermined traffic condition, the occurrence of the predetermined traffic condition for the route may be identified. In another embodiment of the invention, the occurrence of the predetermined condition for a certain percentage of the route may be sufficient to identify the occurrence of the predetermined condition for the route. In yet another embodiment of the invention, when the predetermined traffic condition occurs on average in portions of the route, the route may be identified as having the occurrence of the predetermined traffic condition. In one or more embodiments of the invention, the predetermined traffic condition may include an estimated time for travel between two locations and the occurrence of the predetermined traffic condition may be identified when based on the current traffic level the estimated time for travel is equal to or less than the predetermined traffic condition. In one or more embodiments of the invention, the different criteria for determining whether the predetermined traffic condition has been met, may be set by a user, an administrator, a programmer, a software application, a system or any other suitable entity.

Still continuing with Step 330, in one or more embodiments of the invention, an occurrence of the predetermined traffic condition may be identified in one of multiple routes. For instance, if multiple routes are obtained to travel from a start location to an end location, the occurrence of the predetermined traffic condition for any of the routes may be identified. For example, if the predetermined traffic condition is a twenty minute travel time from location A to location B and three routes from location A to location B are obtained, then the first occurrence of an estimated twenty minute travel time may be identified along with the route in which the predetermined traffic condition occurred.

Once the occurrence of the predetermined condition is identified, a user is notified of the occurrence of the predetermined traffic condition (Step 340). The user may be notified in any manner including (but not limited to) a text message, an electronic message, a page, a sound alert, an alarm, or any other suitable form of a notification or alert. The notification may include or identify the route with the occurrence of the predetermined traffic condition. The notification may also be repeated until a user turns off the notification similar to an alarm.

A user once notified, is able to begin travel on a particular route knowing the desired predetermined traffic condition has occurred. Another embodiment of the invention, allows a user to be notified of the occurrence of the predetermined traffic condition for any route between two locations. This allows the user to select a route based on the notification after the predetermined traffic condition is met and further allows a user to avoid unusual or varying traffic delays associated with routes. In another embodiment of the invention, a business user may coordinate its travel based on the notifications received. For example, a delivery company may provide desk work to truck drivers and send the truck drivers out on routes as soon as the notification is received in order to save time and money while improving efficiency. Further embodiments of the invention allow for savings in cost (e.g., fuel, car brakes in stop and go traffic, car maintenance costs) and time. Furthermore, embodiments of the invention, allow a user to accurately predict travel times and schedule meetings. For example, if a user at location A plans to meet a friend at location B, the first user may wait for an alert of a predetermined traffic condition (e.g., an estimated travel time). Once the alert is received, the user may begin travel to destination B and concurrently notify the friend of the estimated arrival time allocation B.

Figure 4:
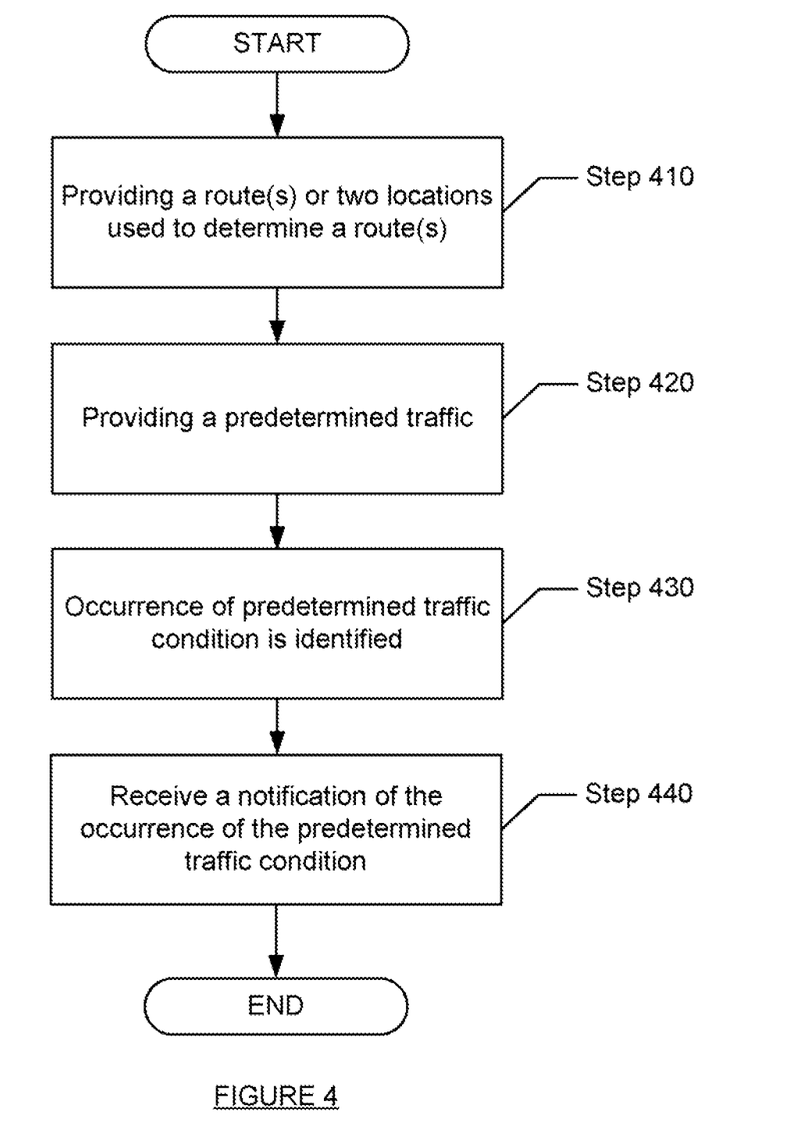
FIG. 4 shows a flow chart for receiving a notification in accordance with one or more embodiments of the invention.

FIG. 4 shows a flow chart for receiving a notification in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a user (or other entity) provides one or more routes or two locations that may be used to determine one or more routes (Step 410). The user may provide the route(s) or the two locations using a website, an application interface, a text message, an electronic message, a letter, or using any other suitable form of communication. Alternatively, the locations and/or routes may be selected from a user profile that includes the routes and/or locations. For example, a web based application may manage user profiles in which a user may store multiple addresses. The user may provide two or more locations by selecting the pre-stored addresses in the user profile. Alternatively, a user may provide the route itself. For example, "start out going southwest on 1201 baker st, take a right a Geary St, take a left union, travel 5 miles and arrive at destination." Alternatively the user may use a script or an application that provides the route.

Next the user (or other entity) provides a predetermined traffic condition (Step 420). In one or more embodiments of the invention, the user may provide the predetermined traffic condition using any interface (e.g., interfaces/methods of communications described above in Step 410). In one or more embodiments of the invention, the user provides the predetermined traffic condition in order for a system or software application to identify the occurrence of the predetermined traffic condition in at least one route between the locations provided by the user (or of the routes provided by the user) (Step 430). Step 430 is essentially the same as Step 330 described above.

Once, the occurrence of the traffic condition is identified, an alert or notification is received notifying the user of the occurrence of the predetermined traffic condition. The notification may be received in any manner including (but not limited to) a mobile device, a kiosk, a monitor, a television, a personal computer or any through any other suitable device. The notification may be in the form of texts, graphics, sounds, physical activity (e.g., vibration of a mobile device) or any other suitable form. In one or more embodiments of the invention, a user waits for the notification before beginning travel. For example, a user may leave a start address after the user is notified of the occurrence of the predetermined traffic condition.

Figure 5:
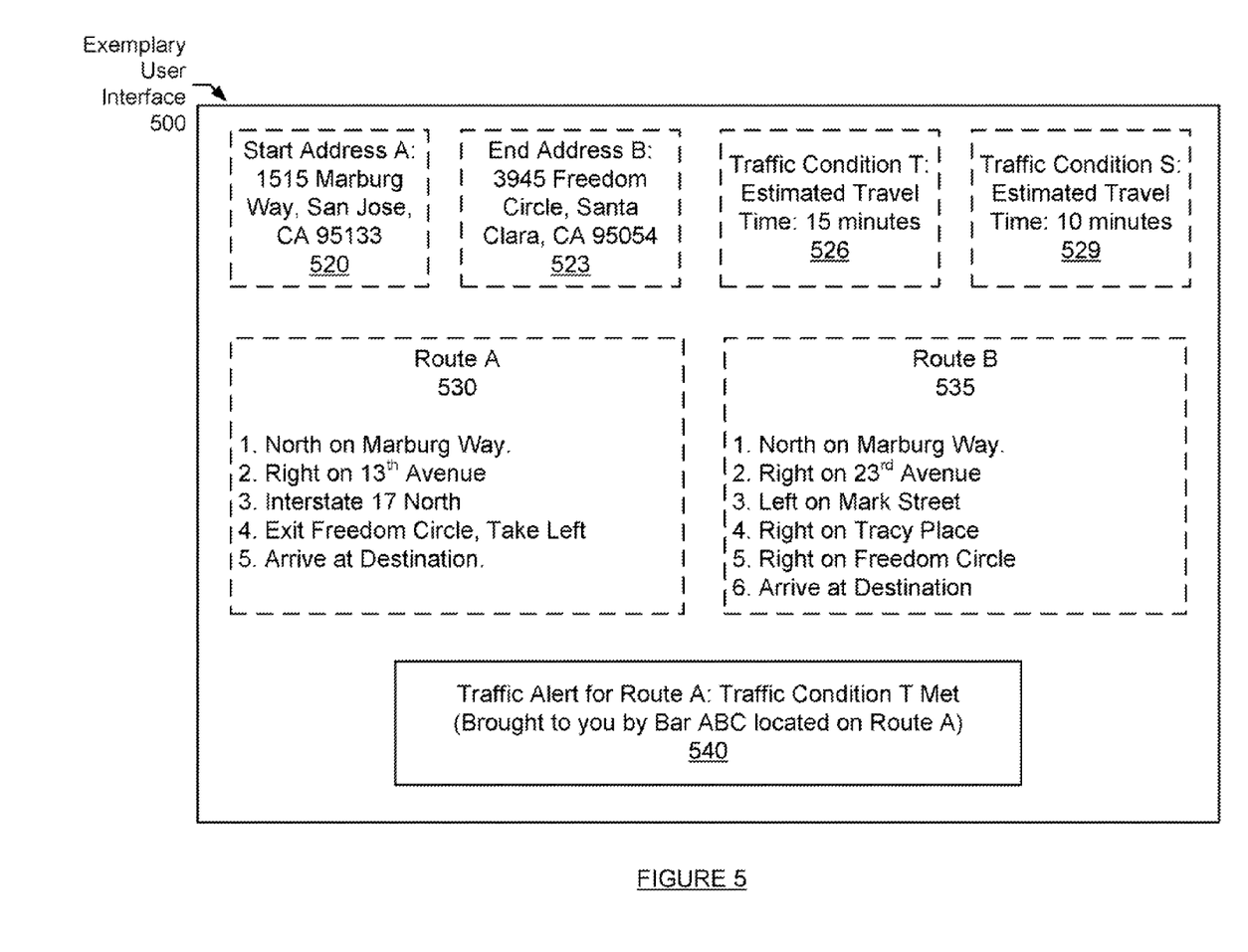
FIGS. 5-7 show examples of an interface for notifying a user in accordance with one or more embodiments of the invention.

FIGS. 5 provides an example of an interface (500) in accordance with one or more embodiments of the invention. As shown, the exemplary user interface (500) includes a start address A (520), an end address B (523), a traffic condition T (526), a traffic condition S (529), a route A (530), a route B (535) and a traffic alert (540). Although shown in one interface (500), those skilled in the art will appreciate that the various components may be distributed over multiple interfaces, be accessed at different times, and are not required in every embodiment of the invention. In this example, the user has entered two addresses (i.e., Start Address A (520) and end address B (523). Further the user has entered two traffic conditions (i.e., Traffic Condition T (526) and Traffic Condition S (529)). In response, the interface displays two routes (i.e., Route A (530) and Route B (535)) which may be used to travel from Start Address A (520) to Start Address B (523). The two routes are consequently monitored for occurrence of either traffic condition. In this case the user wishes to be notified of any route from start address A (520) to end address B (523) with the occurrence of either traffic condition (i.e., Traffic Condition T (526) and Traffic Condition S (529)). In this case, imagine a scenario where the estimated travel time at the time of the user's request was 30 minutes. The interface will notify the user when either route reaches an estimated travel time of 15 minutes and consequently will notify the user again when the estimated travel time reaches 10 minutes. The user first receives traffic alert for route A having met condition T (540). The user having received the notification of the predetermined traffic condition may choose to begin travel or alternatively wait till traffic condition S (i.e. 10 minute travel time) is met.

Figure 6:
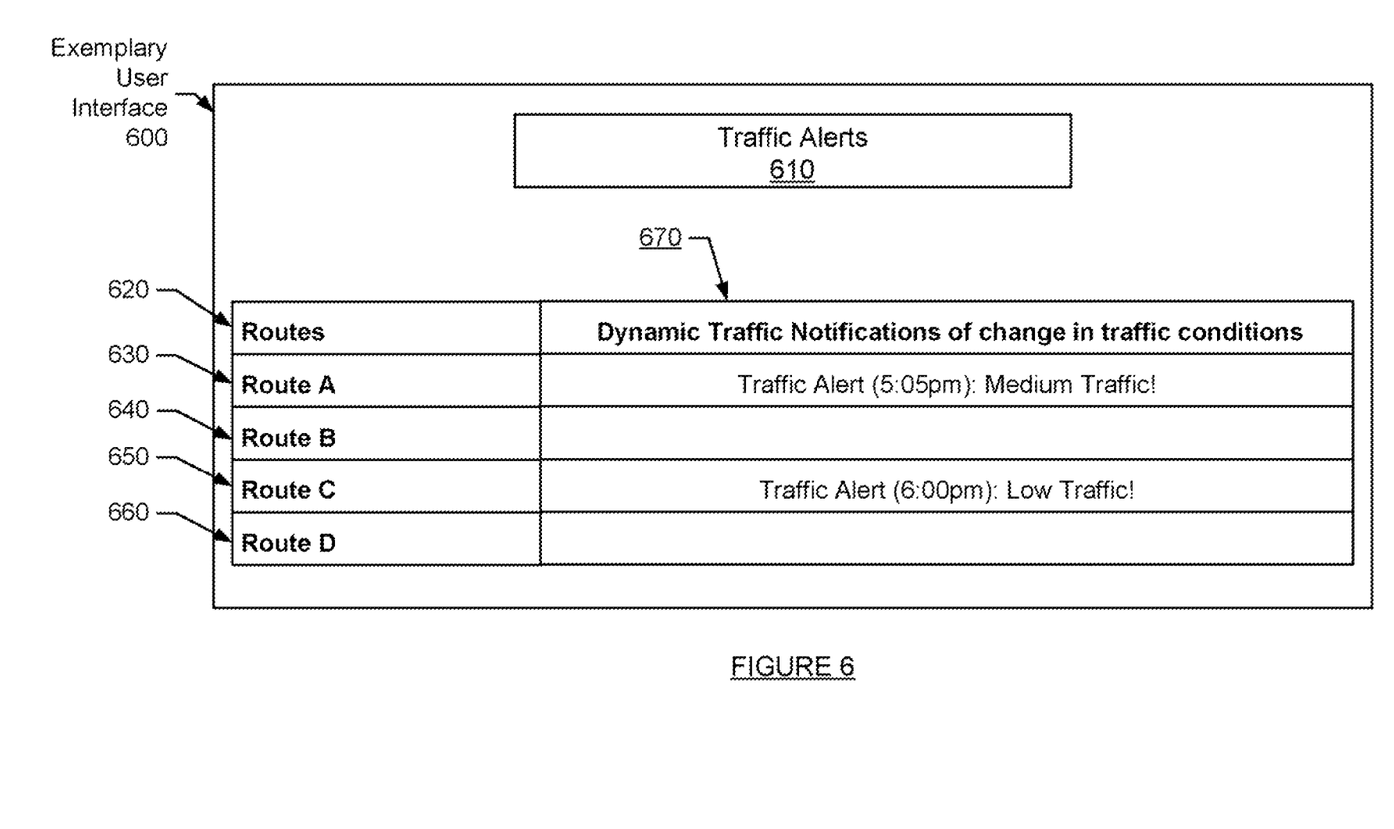

FIG. 6 provides another example of an interface (600) in accordance with one or more embodiments of the invention. As shown in FIG. 6, multiple routes and multiple traffic conditions may also be setup. For example, a delivery route that can take four possible routes to cover all needed delivery stops may use this application to determine the best route based on time and in addition may be notified of the occurrence of a particular traffic condition in order to begin travel.

Figure 7:
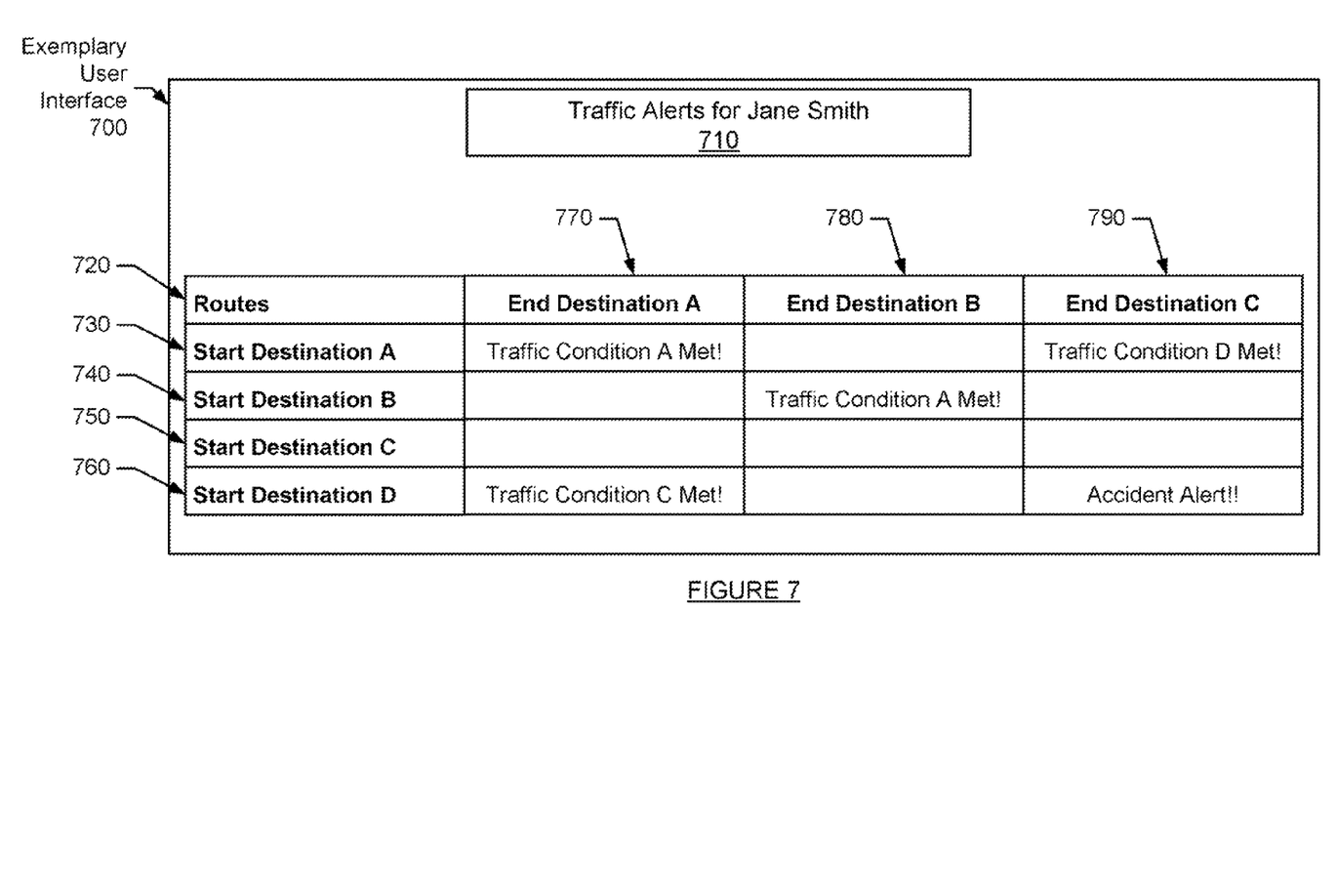

FIG. 7 provides another example of an interface (700) in accordance with one or more embodiments of the invention. As shown in FIG. 7, a grid of multiple locations with different traffic alerts may also be implemented. If for example, user Jane Smith does not have to travel to her destinations in a particular order, she may setup traffic alerts (710) that allow her to dynamically pick the next destination and begin traveling based on the traffic alerts received thus far.

Figure 8:
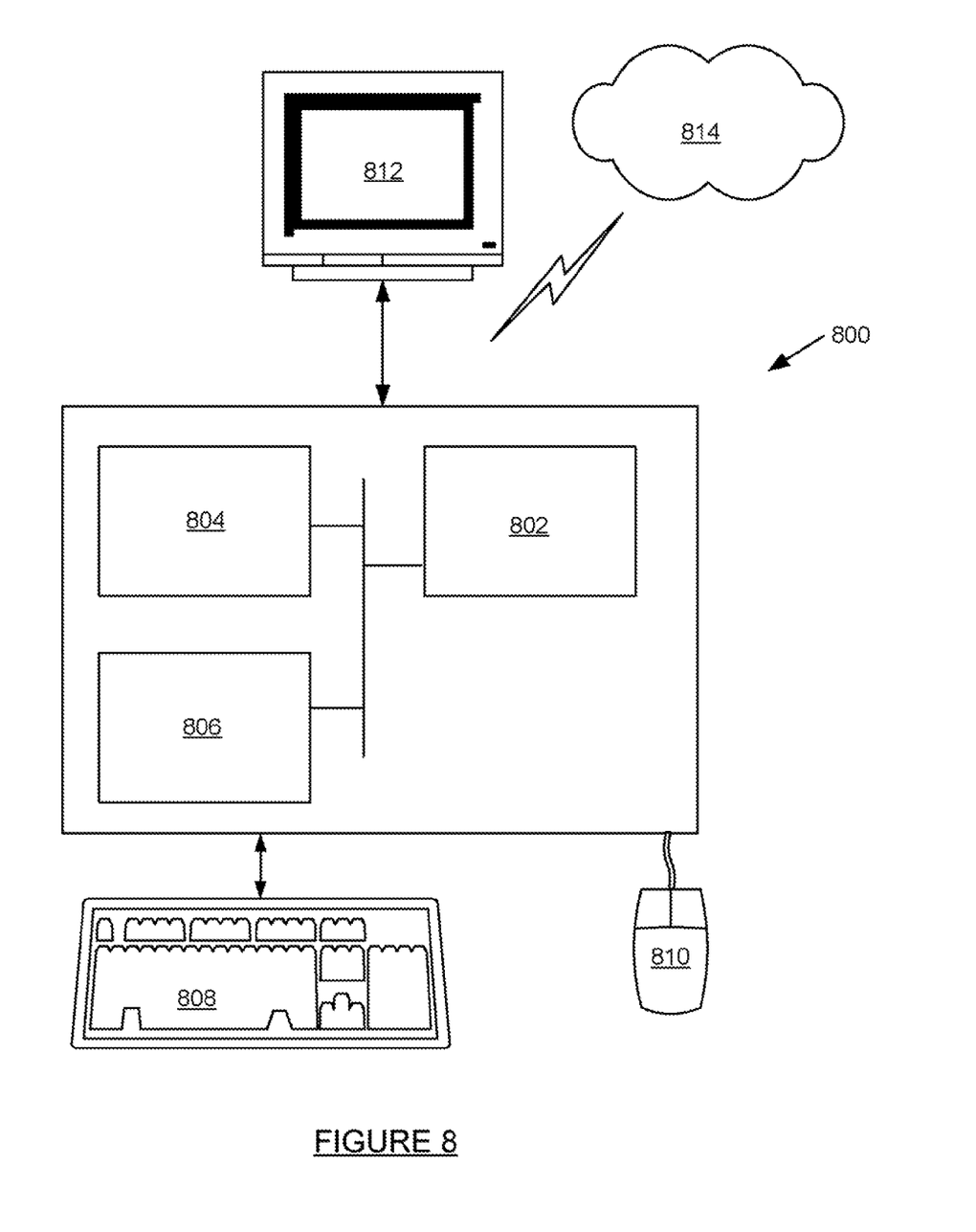
FIG. 8 shows an example of a system for searching forms in accordance with one or more embodiments of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a LAN or a WAN (e.g., the Internet) (814) via a network interface connection. Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by one or more hardware processors, causes performance of operations, comprising:
    obtaining a desired maximum travel time between a first location and a second location;
    monitoring a particular route between the first location and the second location for an occurrence of an estimated travel time for the particular route being below the desired maximum travel time;
    identifying the occurrence of the estimated travel time for the particular route being below the desired maximum travel time;
    transmitting a notification of the occurrence of the estimated travel time for the particular route being below the desired maximum travel time.

2. The medium of claim 1, wherein the operations further comprise:
    obtaining user input indicating a start time after which the occurrence is to be detected;
    wherein identifying the occurrence comprises identifying the occurrence, of the estimated travel time for the particular route being below the desired maximum travel time, after the start time.

3. The medium of claim 1, wherein the operations further comprise:
    obtaining user input indicating a start time and an end time between which the occurrence of the estimated travel time for the particular route being below the desired maximum travel time is to be identified;
    wherein identifying the occurrence comprises identifying the occurrence of the estimated travel time for the particular route being below the desired maximum travel time between the start time and the end time.

4. The medium of claim 1, wherein the operations further comprise determining the estimated travel time for the particular route based on an average speed of vehicles for at least a portion of the particular route.

5. The medium of claim 1, wherein the operations further comprise selecting the particular route from a plurality of routes between the first location and the second location responsive to determining that the estimated travel time for the particular route is below the desired maximum travel time.

6. The medium of claim 1, wherein the operations further comprise selecting the particular route from a plurality of routes between the first location and the second location responsive to determining that the estimated travel time for the particular route is below a threshold value.

7. The medium of claim 1, wherein the estimated travel time for the particular route is estimated based on a level of traffic associated with the particular route.

8. The medium of claim 1, wherein notifying the user comprises signaling the user to begin traveling on the particular route.

9. A non-transitory computer readable medium comprising instructions which, when executed by one or more hardware processors, causes performance of operations comprising:
- monitoring a plurality of routes between a first location and a second location for a first occurrence of an estimated travel time for any of the plurality of routes being below the desired maximum travel time between the first location and the second location;
- identifying the occurrence of the estimated travel time for a particular route, of the plurality of routes, being below the desired maximum travel time;
- selecting the particular route from the plurality of routes based on the occurrence of the estimated travel time for the particular route, in a plurality of routes, being below the desired maximum travel time;
- notifying a user of the selected particular route between the first location and the second location.

10. A non-transitory computer readable medium comprising instructions which, when executed by one or more hardware processors, causes performance of operations comprising:
- providing at least one from a group comprising of:
  - a route; or
  - two locations used to determine the route,
- selecting a desired maximum travel time for the route;
- wherein an occurrence of an estimated travel time for the route being below the desired maximum travel time for the route is identified; and
- receiving a notification of the occurrence of the estimated travel time for the route being below the desired maximum travel time for the route.

11. The medium of claim 10, wherein the operations further comprise:
- providing a start time indicated in a user input, wherein the occurrence of the estimated travel time for the route being below the desired maximum travel time for the route is to be detected after the start time.

12. The medium of claim 10, wherein the notification is received using a mobile device.

13. The medium of claim 10, wherein the notification comprises a notice to begin traveling on the route.

14. The medium of claim 10, wherein the operations further comprise:
- receiving an advertisement concurrently with receiving the notification, wherein the advertisement is selected based on the route.

* * * * *